United States Patent [19]

Antpöhler

[11] Patent Number: 4,535,687
[45] Date of Patent: Aug. 20, 1985

[54] DEVICE FOR THE MANUFACTURE AND PROCESSING OF BISCUIT MIXTURE SHAPES

[76] Inventor: Heinz-Josef Antpöhler, Lippstädter; Strasse 68, D-4795 Delbrück, Fed. Rep. of Germany

[21] Appl. No.: 512,061

[22] Filed: Jul. 8, 1983

[30] Foreign Application Priority Data

Jul. 17, 1982 [DE] Fed. Rep. of Germany ....... 3226795

[51] Int. Cl.$^3$ ............................................. A47J 37/00
[52] U.S. Cl. ........................................ 99/334; 99/342; 99/353; 99/355; 99/423; 99/431; 99/443 C; 425/239; 425/270; 425/286; 425/447; 426/509; 426/512
[58] Field of Search ..................... 425/238, 239, 405 R, 425/438, 444, 447, 448, 461, 269, 270, 276, 279, 282, 286; 426/496, 512, 503, 523; 99/334, 342, 352, 353, 355, 443 C, 426, 428, 431, 422, 423

[56] References Cited

U.S. PATENT DOCUMENTS

| | | | |
|---|---|---|---|
| 2,383,536 | 8/1945 | Elliott | 425/239 |
| 2,717,560 | 9/1955 | Kottmann | 99/353 |
| 2,962,985 | 12/1960 | Castronuovo | 99/423 X |
| 3,718,487 | 2/1973 | Brunner | 99/353 |
| 4,083,296 | 4/1978 | Mede | 99/423 |

Primary Examiner—Billy J. Wilhite
Attorney, Agent, or Firm—Sprung, Horn, Kramer & Woods

[57] ABSTRACT

A device and a method for the manufacture and processing of biscuit mixture shapes, including pressing pick up devices by means of a drive with their forming chambers against the floor of a trough filled with biscuit mixture, and while there, rotating them by means of a drive by 360°, while a drive turns the trough somewhat further. Subsequently the pick up devices are raised and placed by a drive in a position above a band conveyor with baking sheets. By means of a drive the ejectors are then moved into the forming chambers and the formed biscuits are deposited by stripping device onto the baking sheet. The baking sheet is fitted with recesses of specific design. The band conveyor transports the formed biscuits into a plant comprising an oven, a cooling device, a second heating device, a removal device and stacking chambers for baking sheets. The removal device is largely identical with the mixture pick up device. The trough receives a supply of mixture which is controlled by a level indicator.

20 Claims, 9 Drawing Figures

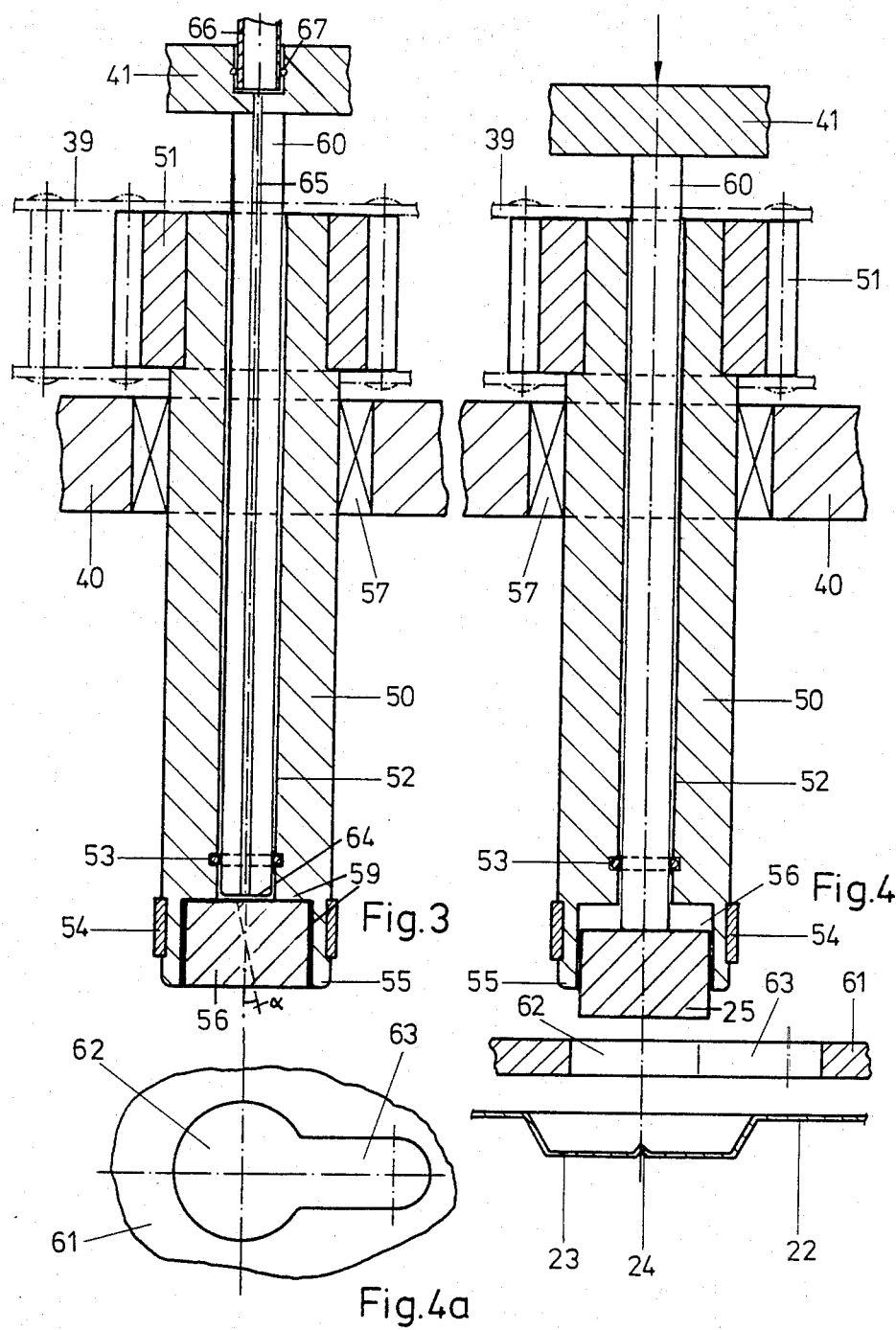

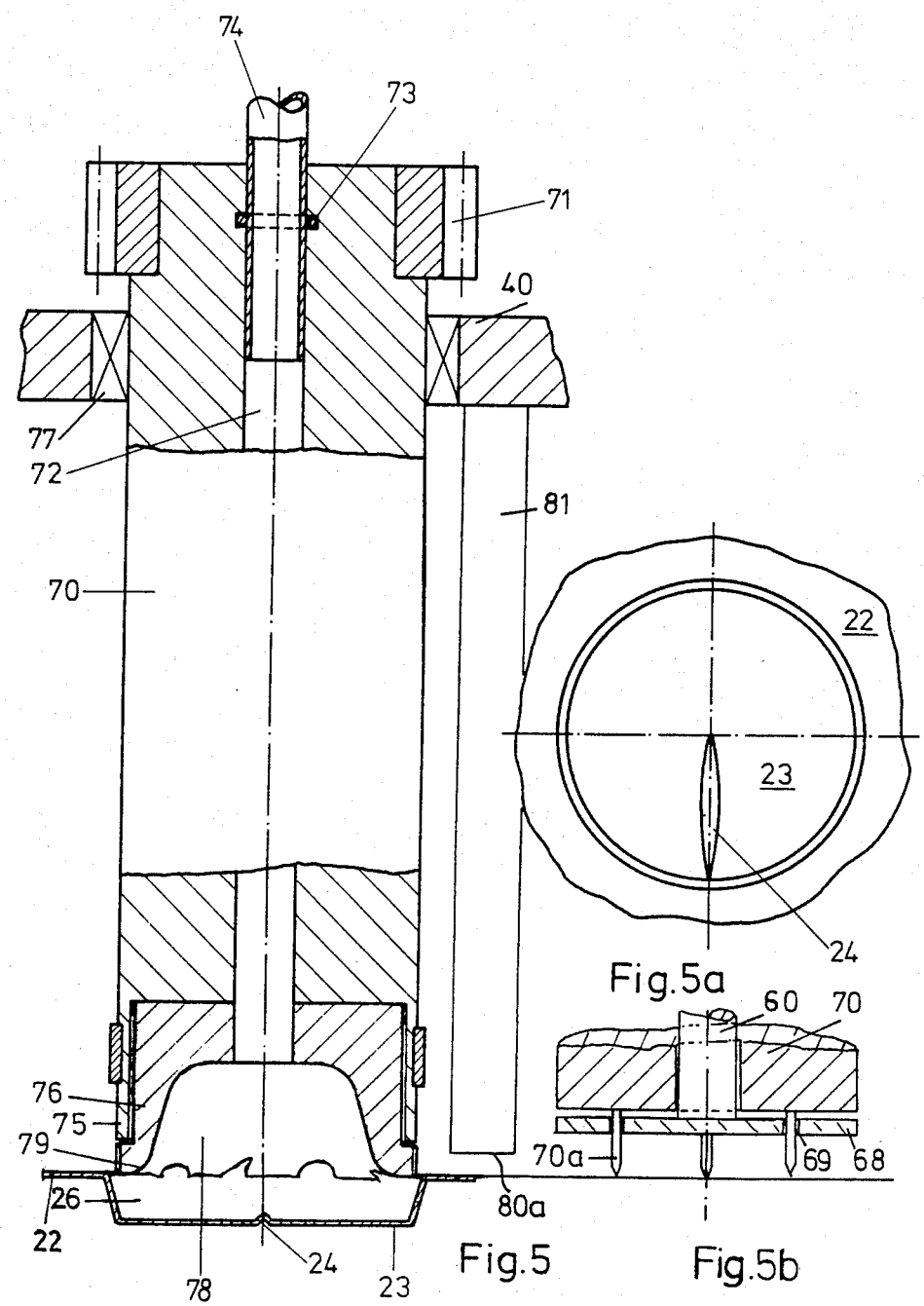

DEVICE FOR THE MANUFACTURE AND PROCESSING OF BISCUIT MIXTURE SHAPES

BACKGROUND OF THE INVENTION

This invention relates to a device for the manufacture and individual deposit of biscuit mixture shapes on a preferably stepwise drivable band conveyor or baking sheet.

A known device produces biscuit mixture shapes by forming mixture strips, subsequently slicing them and depositing these slices on a baking sheet or band conveyor.

However, this device is unsuitable for mixtures containing whole fruit, nuts, almonds and the like, and also including a high percentage of sticky components, for example honey and fat, as the fruit is destroyed in the formation of strips and again in the cutting of the strips. Nor is the device suitable for processing sticky mixtures, as during cutting the slices remain partly attached to the knife and partly to the supporting tray, and cannot be deposited separately in good condition on the baking sheet. Therefore, biscuits shaped from this type of mixture, for example Florentines have heretofore been made by hand.

SUMMARY OF THE INVENTION

It is the object of the invention to disclose a device by means of which it is possible to manufacture shapes from a mixture containing whole fruit, nuts, almonds, etc., and/or a high percentage of sticky components, such as honey and fat, which does not suffer from the above disadvantages.

This object is achieved in that the device comprises a trough with a floor for the biscuit mixture, and includes at least one pick up device with a preferably cylindrical forming chamber that is open on one side, is formed by a forming wall, terminates in a rim, and is preferably provided with an axial bore that enters into the said forming chamber, said device further comprising a drive by means of which the forming chamber can be positioned in such a manner that in a first position the rim touches the floor and in a second position the rim is above the band conveyor or the baking sheet, said device also comprising a drive that is capable in a first position of rotating the pick up device axially to the forming chamber and relative to the floor, and an ejector that is slidable in the bore and is adjustable by means of a drive in such a manner that it is either in flush alignment with the forming wall with one leading end or enters into the forming chamber, and/or finally comprises a controllable supply of compressed air through the bore.

In addition to solving the main problem of producing biscuits from the abovedescribed mixtures by mechanical means, in other words, of producing formed biscuits, it is an advantageous further development of the invention to integrate this device into a fully automated production plant. To this end, additional advantageous modifications of the baking sheets, the conveying equipment, the device for removing the biscuits and the overall control of the installation are described with reference to an exemplary embodiment and are claimed in the claims.

BRIEF DESCRIPTION OF THE DRAWINGS

An embodiment of the invention is illustrated in FIGS. 1 to 6, wherein:

FIG. 3 is a vertical section of the biscuit pick up device;

FIG. 4 is the view of FIG. 3 with the pick up device in the "ejecting" position;

FIG. 4a is a plan view relative to FIG. 3 of the stripping device and a vertical cross section relative to FIG. 4;

FIG. 5 is a vertical section of a removal device;

FIG. 5a is a plan view of a baking sheet detail;

FIG. 5b is a vertical section of a removal device and

DETAILED DESCRIPTION OF THE PREFERRED EMBODIMENTS

Figure 1:
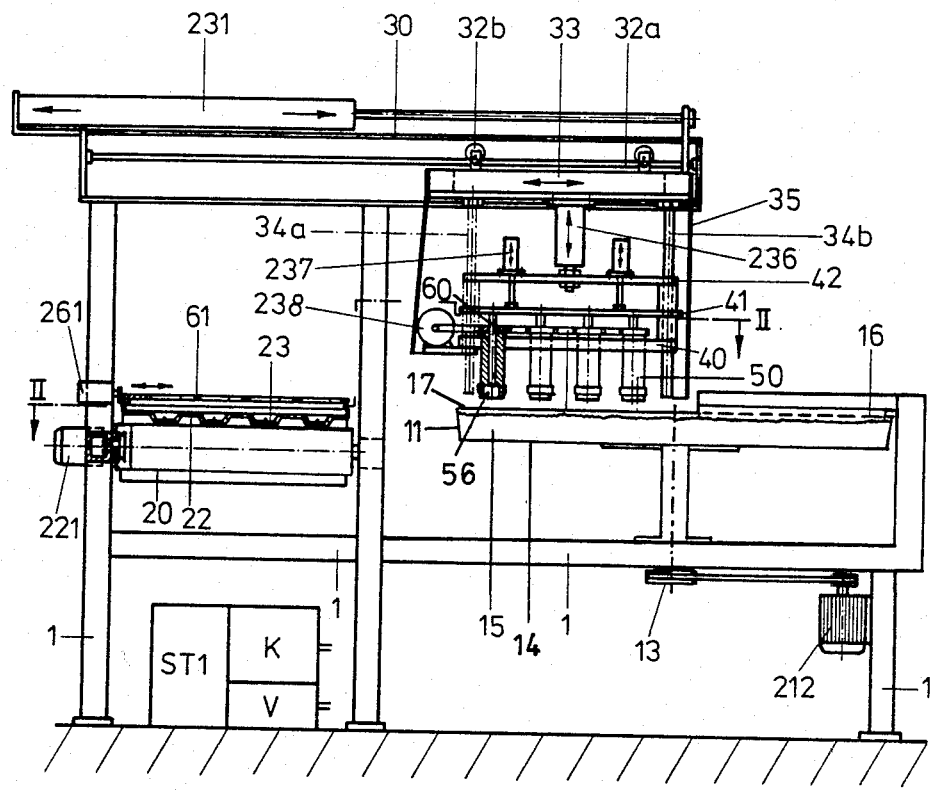
FIG. 1 is an elevation and partial vertical section of the device producing the formed biscuits.

The device is shown in profile view in FIG. 1, the band conveyor 20 for the baking sheets 22, the trough 11 for the mixture 15 and the protector 35 against accidental access to moving parts being shown in section. The whole device is arranged in a framework 1 of steel supports. The mixture 15 is in a round trough 11 that can be rotated about its axis 13 by means of drive 212. An elastic distributor 16 of, for example, rakelike construction, projects radially into trough 11 and evenly distributes the mixture to approximately the same height, levelling out any hollows produced by the removal of mixture, while the trough rotates.

A set of pick up devices 50 is lowered from above into trough 11 and picks up some dough. Pick up devices 50 are arranged on a bearing plate 40 which is vertically slidable on guide rods 34a, b and is driven by means of drive cylinder 236. The whole arrangement is suspended from a transverse transport 30, composed of a carriage 33 with rollers 32b arranged horizontally slidable on rails 32a, said carriage being moved by drive cylinder 231 between the position above trough 11 and a position above the band conveyor 20, which transports the baking sheets.

Figure 2:
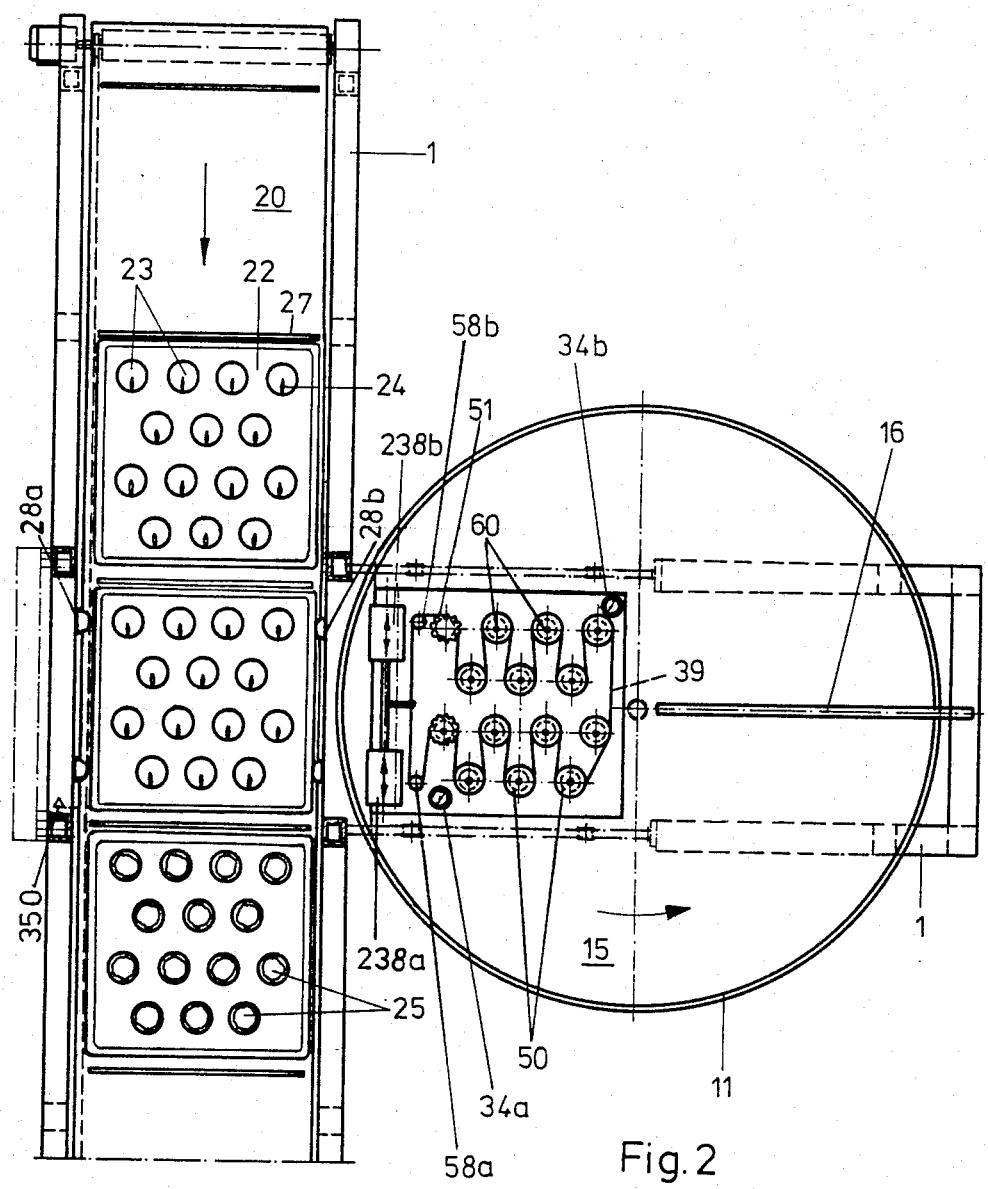
FIG. 2 is a horizontal section along line II of the device according to FIG. 1.

In FIG. 2 the device is illustrated in cross section which shows that a total of fourteen pick up devices 50 are arranged in four staggered rows. At their top ends pick up devices 50 are fitted with a sprocket 51 on which a continuous driving chain 39 moves, said chain being additionally guided via redirecting wheels 58a,b and being moved to and fro by driving cylinders 238a,b in such a manner that the pick up devices 50 are rotated around their axes backwards and forwards about 360°. Driving cylinders 238a,b are mounted on bearing plate 40. Driving cylinders 237 are also connected with bearing plate 40 via drive support 42, ejector carrier 41 being moved vertically by said drive cylinders. Fourteen ejectors 60 are secured to the base of this ejector carrier and project downwards into central bores 52 of the pick up devices 50.

FIG. 3 shows details of pick up device 50 and of ejector 60 in vertical section. Pick up device 50 is a plastic cylindrical member measuring approximately 30 mm in diameter, and is rotatably held above its middle in bearing 57 in bearing plate 40. Sprocket 51 for chain drive 39 is arranged above bearing plate 40. A bore 52 measuring approximately 10 mm in diameter extends axially in pick up device 50. A plastic ejector 60 is guided in said bore with a sealing ring 53.

At its lower end pick up device 50 is fitted with a cylindrical forming chamber 56 of 24 mm diameter and 15 mm depth, formed by forming wall 59. Because of the high stress to which the pick up device is subjected during picking up of the mixture, it is reinforced with a ring 54 of brass or stainless steel fitted about the plastic outside wall of forming chamber 56. Edge 55 of the forming wall is rounded. In a preferred embodiment forming chamber 56 is bored slightly off centre, or, as shown in FIG. 4, inclined by a small angle α relative to the bearing axis of pick up device 50, resulting in reduced adhesion of the mixture on forming wall 59 when combined with the rotating movement.

FIG. 3 shows the ejector 60 in its top position relative to pick up device 50. In its top position its leading surface 64 ends flush with the top of the forming chamber.

In FIG. 4 ejector 60 is shown in an intermediate stage of the ejecting movement and the partly ejected biscuit can be seen. At the end of the ejecting movement leading surface 64 projects slightly beyond the edge 55. At this stage, carriage 33 is positioned above baking sheet 22 and edges 55 of the ejectors are just above a plastic stripping device 51 equipped with a bore 62 (FIG. 4a) under each pick up device 50, the diameter of said bore being slightly larger than the biscuit. A slot 63, which is slightly wider than the diameter of the ejector 60 laterally adjoins bores 62.

Baking sheet 22 is fitted with recesses 23, which, during ejection, are positioned under the pick up devices (FIG 4a) and are located under the stripping device 61, said recesses 23 being arranged in a pattern that is identical with that in which the pick up devices are arranged. The stripping device 61 is equipped with a driving cylinder 261 by means of which it is moved laterally in the direction of the slot 63, causing it to detach the formed biscuit from the ejector 60.

When the formed biscuits 25 have dropped on to the baking sheet 22, the latter is moved along by entrainers 27 of band conveyor 20 by means of drive 221, and a new baking sheet is placed into the ejecting position.

As far as necessary, all pneumatic drives are connected via controllable valves with a compressor K or a vacuum plant V. The drives or, respectively, valves are controlled via a control plant ST1. Movement of the drives is limited or determined in known manner by abutments and position indicators in each case. The various functions of the operation are controlled in a sequence.

The particular problem posed by the production of formed biscuits is the difficulty of picking up a specific amount of biscuit mixture without destroying individual items of fruit, having some of the mixture drop from forming chamber 56, or having some or all of the mixture remain stuck thereto during ejection. For this reason mixture 15 in trough 11 is kept at approximately twice the height of the forming chamber depth. The mixture temperature is adjusted to approximately 60° C. to utilise the optimal formable consistency.

The drive 236 gently lowers pick up devices 50 to floor 14 of trough 11 and then raises them again minimally. They are subsequently rotated by 360° around their axes by drive 238. Any superfluous mixture is moved to the side by the rotation; rounded edge 55 preventing crushing of the fruit. In addition, in order to definitely break the sticky attachment between mixture and trough base 14, caused by the honey and sugar component of the formed biscuit, the rotation of trough 11 is continued for a few more centimeters while pick up devices 50 rotate in the lowered position, thus shearing off the attachment. Pick up devices 50 are subsequently raised and placed laterally for ejection by means of transverse transport 30.

During ejection by lowering of ejector 60, pick up devices 50 are rotated back by drive 238 and this is followed by the abovedescribed movement of stripping device 61.

To support the ejection process, ejector 60 is furnished in a preferred embodiment with an axial bore 65 that is connected via a seal 67 to a pipe 66 of a compressed air distributor and is charged with compressed air via a controllable valve during the ejection process.

All parts entering into contact with the mixture in the process of forming the biscuits are manufactured from polytetrafluoroethylene or a similarly by suitable plastic of low surface adhesion. Baking sheet 22 is also provided with an adhesion reducing layer.

The device can be modified for larger or smaller output or for other biscuit sizes by corresponding alterations, and linear transports can be replaced by rotating transports, and vice versa, or, alternatively, the relative movements of trough and pick up device, of pick up device and band conveyor, of the pick up device to the stripping device, of pick up device to the trough floor etc., can be produced by movement of the respective other part in place of the stated part, without departing from the main idea of the invention. Thus, the addition of the rotating movement of the pick up device 50 to the movement of trough 11 or, respectively, trough floor 14, can also be replaced by an off centre rotation of pick up device 50, alternatively, transverse transport 30 can perform a partial movement.

Instead of being placed on individual baking sheets, the formed biscuits can also be deposited on a continuously moving band or into a package, and thus be conveyed to a deepfreeze plant for intermediate storage or to an oven.

If the mixture contains a smaller proportion of sticky ingredients, it is also possible to simplify the device by conducting vacuum and compressed air during picking up or ejection directly through the bore 65 of about 1 mm diameter into the forming chamber 56, instead of passing it through the ejector 60. This does away with ejector 60 and its drive 237. In this embodiment bores 65 are connected to a distributing arrangement providing valve controlled compressed air or vacuum.

As illustrated in FIG. 4a the shape of the recesses 23 in baking sheets 22, whose volume corresponds approximately to the size of the formed biscuit while their depth is about equal to half the height of the formed biscuits, is particularly well suited to the processing of Florentine mixture, as the melting of the sugar and fat components of the biscuits during baking causes the fruit to be raised as the main structural element. The side wall of recess 23 has a conical 45° slope to facilitate the unmoulding of the biscuits. For the same purpose, a ridge 24 measuring 1 to 2 mm in height is radially arranged in the recess. As a sticky oil film is formed under the biscuit, demoulding is possible only if air can enter laterally under the Florentine, and this is assured by the ridge 24 (FIGS. 4a, 5a) when combined with a force that acts on the biscuit as a result of rotation and off centre movement. Mechanical removal of the biscuits from the baking sheet 22 by this method is thus possible.

The removal member 70 of a suitable device is the important element illustrated in FIG. 5. Preferably, the device 110 (FIG. 6) corresponds largely to the pick up device 109, which is the one illustrated in FIGS. 1 and 2; merely its trough 11 has been replaced by an additional band conveyor 80 and the ejector 60 has been eliminated. Instead of pick up devices 50, removal members 70 are arranged in the above described pattern, in bearing plate 40 with bearings 77. Chain drive 39 is guided over sprocket 71, which rotates removal member 70 when it is desired to loosen the biscuits.

A vacuum is applied to the axial bore 72 of removal device 70 through pipe 74 via a distributor, causing the biscuit to be drawn up by suction and to be held during transverse transport from band conveyor 20 to band conveyor 80. The energy created by the rotation of the removal device is transmitted to the biscuit and sealing of the vacuum relative to the biscuit is established by a pack of foam material 70 in a recess on the leading end of removal device 70, its sealing lips 79 measuring several millimeters in thickness and projecting laterally beyond the edge 75 of the recess. The diameter of the sealing pack 76 corresponds approximately to the size of the Florentine biscuit. While on the one hand, the foam material is abrasion resistant to prevent contamination of the biscuit, it is of an elasticity such as to prevent the fruit from being destroyed and to surround them to the extent that the vacuum is provided with an adequate seal.

Figure 6:
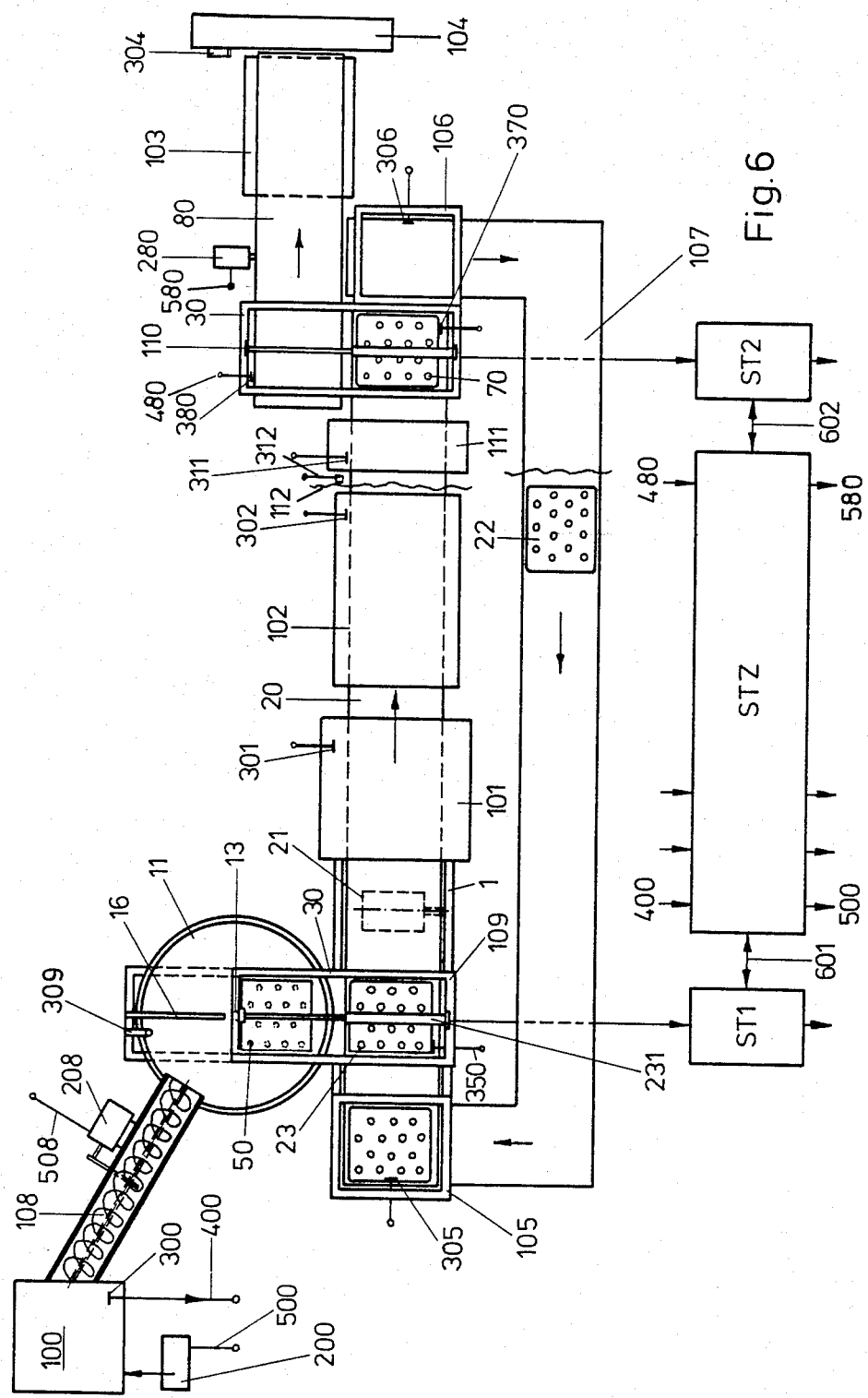
FIG. 6 is a production plant for Florentines with control.

To assist in their detachment from the baking sheet and prevent breaking of the biscuits a cooling device 102 and a second heater 111 are inserted between the oven 101 and the removal device 110 (FIG. 6). The cooling device 102 hardens the biscuits, and cooling is therefore applied from above. In the second heating device baking sheet 22 is briefly heated to fluidize the oil film between the baking sheet 22 and the biscuits, yet not softening the biscuits.

A fully automatically controllable production plant for Florentine biscuits is illustrated in FIG. 6, in which the pick up device 109 and the detachment or removing device 110, in conjunction with conveyors 20, 107, which move the baking sheets 22 through oven 101, cooling device 102 and second heater 111 represent the main component groups.

A biscuit mixture mixer 100 supplies the pick up device 109 via a mixture transporting device 108 of known construction in such a manner that trough 11 always contains sufficient mixture of the preferred temperature.

Transverse transporting device 30 of pick up device 110 deposits the biscuits on a band conveyor 80 of a chocolate icing device 103 of known construction, which is followed by a packing plant 304.

The operation of all component groups of the plant is coordinated by a control centre STZ which is either connected to the drives and function indicators directly, or to the control devices ST1, ST2 of the devices. In the interest of clarity the reference numerals have been selected so as to have the same initial digit, hence the component groups are identified by 1 x y, the associated drives or temperature adjusting instruments by 2 x y, the operating indicators by 3 x y, the signalling lines of the operating indicators by 4 x y, and the control lines of the drives and temperature adjusting instruments by 5 x y. The individual drives of the component groups operate when the operating indicators of the following component groups signal that they are ready to commence operation, and when the component group itself is in receipt of material and, in a given case, has reached the prescribed operating condition, for example, a prescribed temperature.

For example, drive 280 and icing plant 103 commence to operate when the supply indicator 380 signals that the biscuits have been deposited on the band conveyor 80 by the removal devices and when packing plant 304 is ready to commence operating.

Removal device 110 operates in corresponding manner when the packing and icing plant, on the one hand, is ready to operate, and when, on the other hand, return transport 106, 107 at the signalling device 306 signals free capacity, and signalling device 370 signals to pick up device 70 the presence of a heated baking sheet in the correct position.

The various sequences of movements and the establishment of vacuum are controlled by control section ST2, which, in corresponding simplification, is designed like control section ST1.

Oven 101, cooling device 102 and second heater 111 are each equipped with temperature sensors 301, 302, 311, which ascertain the zone temperature and preferably also the baking sheet temperature. As the time spent in the oven is predetermined, it is necessary that in the event of faults in the removing device 110, 111 of the icing or packing plant, there is always enough free storage space 112 in front of the former and that this is signalled by signalling device 312 before drive 21 transports an additional baking sheet with formed biscuits into oven 101, and pick up device 109 becomes active again.

The various controlled processes of picking up mixture and depositing the formed biscuits on the baking sheets takes place in the abovedescribed manner and is controlled by control section ST1. An operating process is triggered off whenever oven 101 is ready to receive formed biscuits, as indicated above, i.e., when signalling device 350 signals that a baking sheet is in the correct position and when mixture level signalling device 309 signals that sufficient mixture is available.

Provided signalling device 300 signals the availability of mixture at the prescribed temperature, drive 208 of mixture conveyor 108 operates as controlled by mixture level control 309.

If, in accordance with a demand for mixture received by mixture conveyor 108, no mixture is available, mixture mixing device 100 is activated via control line 500.

A stacking device 105 with a signalling device 305, similar to stacking chamber 112, is also arranged along the return transport path 107 of the baking trays. Storage chamber 112 is appropriately furnished with a stacking device.

The illustrated conveying installations 20, 107, 80, 108 can, of course also be replaced by other known arrangements, for example, depending on the available space, it may be advisable to replace the band conveyor with several sectional conveyors.

When the length of the installation is limited, it may be advisable to arrange continuous lift transports for the baking trays with a capacity that corresponds to the relative time during which the material to be baked remains in the respective component groups. In this case it is useful to provide slides for the baking trays between the component groups, and there is then no need for a separate drive.

In another embodiment an endless band fitted with corresponding recesses replaces the band conveyor 20 used in connection with individual baking sheets 22, said fitted endless band being suitably guided through the component groups. Band returning section 107 for the baking sheets is shown merely diagrammatically in FIG. 6. Preferably, it is arranged above or below the installation to provide good access to all component groups and to keep the charging area as small as possible. Band conveyor 20 and its drive can be aligned perpendicularly to the band conveyor 80.

It is, of course, possible to insert additional buffer and transport devices if the processing sequence and other spatial arrangements are modified. It is also possible to couple sections of the installation with known devices for producing other types of biscuits by using points to switch the conveying paths accordingly.

A preferred connection with a known device for the manufacture and separation of items of formed mixture, said device operating in accordance with the extrusion process, is carried out before oven 101. It is then also possible to insert removal device 110.

Particularly device 109 for producing the formed biscuits, and also the removal device 110 as well as the total plant according to FIG. 6 represent independent inventions which cooperate to great advantage in the illustrated plant. It is of particular advantage that devices 109 and 110 are identical in the majority of their parts and their control.

The novel baking sheet alone represents an inventive design and is used to advantage with the removal device 110 and with the second heater 111.

If the formed biscuits remain in their precise position in the recesses of the baking sheets during processing the removal device is simplified and provision is made for the precise positioning during subsequent processing steps, so that here too corresponding simplifications are achieved.

FIG. 5b illustrates an alternative embodiment of the removal device 70. Here, steel pins 70a are arranged on the lower leading surface 4. When the removal device is lowered, the pins are pressed into the biscuits to the extent of some millimeters, and, during a subsequent rotation of about 20° about the axis of the removal device, the detach the biscuit from the baking sheet. While being transported to the position above the band conveyor 80, the biscuit remains suspended from pins 70a. On arrival there it is stripped from the pins by ejector 60, at the lower end of which there is arranged a stripping disk 68, whose diameter is identical to that of the biscuit, and through which pins 70a are passed in bores 69.

In order to assure that pins 70a penetrate the biscuits by the precise length and to avoid scratching of the baking sheet, bearing plate 40 is equipped with a holding down device 81 between the removal devices, said holding down device being of a length to ensure that pins 70a extend to approximately half the depth of recesses 23 when leading end 81a of the holding down device contacts baking sheet 22.

The claims defining the invention are as follows:

1. In a device for the manufacture of biscuit mixture shapes and for individually depositing said biscuit mixture shapes on to a band conveyor, the improvement comprising: a trough for the biscuit mixture having a floor, at least one pick up device having a forming wall defining a cylindrical forming chamber open at one end and terminating in a rim and an axial bore opening into said forming chamber at the other end thereof, drive means for moving the forming chamber into a first position wherein the rim touches the floor of the trough and into a second position wherein the rim is above the band conveyor and for rotating the pick up device axially of the forming chamber, relative to the floor when the pick up device is in the first position, and ejector means coactive with the axial bore for ejecting biscuit material from the forming chamber.

2. A device according to claim 1, wherein the pick up device comprises a cylindrical member provided at one leading end with the forming chamber, the diameter of which is equal to approximately one and a half times its depth, and wherein the bore extends concentrically to the forming chamber, the bore diameter equalling approximately one third of the forming chamber diameter, and wherein the drive means comprises a bearing in which the pick up device is rotatably arranged and having a coaxial sprocket, and a chain connected thereto and wherein the axis of the forming chamber is not aligned with the bearing axis of the pick up device.

3. A device according to claim 2, wherein the bore is arranged concentrically in the pick up device and has a diameter of approximately 1 mm.

4. A device according to claim 2, wherein the ejector means comprises means slidably and rotatably arranged in the bore with a sealing ring near the forming chamber.

5. A device according to claim 2, wherein the ejector means and the pick up device are constructed from plastic material, and that the wall of the forming chamber is reinforced with a metallic ring.

6. A device according to claim 2, comprising at least one row of pick up devices vertically mounted in a bearing plate, with their axes in parallel relationship with those of the bearing plate bearings, and their sprockets being connected by a continuous chain and wherein the ejecting means comprises an ejector carrier arranged parallel to the bearing plate, and the drive means has a stroke that is somewhat longer than the depth of the forming chamber and is arranged between the bearing plate and the ejector carrier.

7. A device according to claim 6, further comprising guide bars vertically guiding the bearing plate and wherein the drive means therefor has a stroke somewhat longer that the depth of the trough.

8. A device according to claim 6 or 7, further comprising a horizontal parallel guiding device disposed above the trough and the band conveyor, and the bearing plate is horizontally positionably connected with the drive means.

9. A device according to claim 8, further comprising a stripping device horizontally and latarally slidably arranged above the band conveyor and measuring some millimeters in thickness and having bores of a diameter slightly larger than the forming chamber, the pattern in which said bores are arranged corresponding to that of the pick up devices, said bores being extended in the direction of slidability by a slot of a width that is somewhat larger than the diameter of the ejector means and the length of which corresponds approximately to the diameter of the bore.

10. A device according to claim 9, further comprising drive means for the stripping device for moving the stripping device in line with the slot by the diameter measurement of the bore.

11. A device according to claim 6, wherein the drive means is pneumatically controlled and comprises two pneumatic drives moving the chain back and forth, their stroke corresponding approximately to the circumference of the sprockets.

12. A device according to claim 6, wherein the trough is round and has a radius that is somewhat larger than the expanse of the row arrangement of the pick up devices, and means rotatably mounting the trough at its centre comprising a bearing and a stepwise controllable drive.

13. A device according to claim 12, further comprising an elastic rake-like distributor projecting radially into the trough at a height corresponding to two to three times the depth of the forming chamber.

14. A device according to claim 6, further comprising at least one baking sheet disposed on the conveyor and which is equipped with round recesses, their volume corresponding to the volume of the forming chamber, their depth corresponding to about half the depth of the forming chambers, their sides sloping conically at an angle of about 45° and equipped radially with a wedge-like ridge of approximately 1 mm height, and wherein the arrangement of the recesses is identical with that of the pick up devices.

15. A device according to claim 14, further comprising entrainers on the band conveyor and framework guides for the baking sheets and means for indicating when the baking sheet is located underneath the pick up devices.

16. A device according to claim 15, further comprising a control plant to which the drive is connected by control lines.

17. A device according to claim 6, further comprising an oven downstream of the pick up device, a cooling device downstream of the oven, an additional heater downstream thereof, a removal device downstream of the heater and a second pick up device.

18. A device according to claim 17, further comprising baking sheets on the band conveyor and a stacking room through which the sheets pass before the second pick up device and downstream of the cooler, continuous lifts in at least one of the oven and the cooler.

19. A device according to claim 17 or 18 wherein the second pick up device deposits the biscuits on a second band conveyor for transport into a chocolate icing plant and from there into a packing plant.

20. A device according to claim 17, further comprising a central control device connected with indicating means by signal lines, and with the drive means by control lines, and with the pick up device and the removal device by signalling and control lines.

* * * * *